United States Patent [19]

Molina

[11] Patent Number: 4,975,007

[45] Date of Patent: Dec. 4, 1990

[54] CAPTIVE FASTENER

[76] Inventor: Jorge Molina, 7361 El Nido, LaVerne, Calif. 91750

[21] Appl. No.: 362,759

[22] Filed: Jun. 7, 1989

[51] Int. Cl.⁵ .............................................. F16B 21/18
[52] U.S. Cl. .................................... 411/107; 411/112; 411/353
[58] Field of Search ............... 411/103, 107, 112, 352, 411/353, 999

[56] References Cited

U.S. PATENT DOCUMENTS 3,995,675  12/1976  Cosenza .................................. 70/353
4,655,658   4/1987  Guistan ................................. 411/353
4,723,881   2/1988  Duran ................................... 411/353
4,735,536   4/1988  Duran ................................... 411/353

Primary Examiner—Robert L. Wolfe
Assistant Examiner—Suzanne L. Dino
Attorney, Agent, or Firm—Richard F. Carr; Richard L. Gausewitz; Allan Rothenberg

[57] ABSTRACT

A captive screw is provided which has a head and a threaded shank with grooves extending inwardly from the outer end of the shank, with a washer extending around the shank and provided with tabs extending into the grooves. A bore is provided in the outer end of the shank and formed with an undercut portion of enlarged diameter. A plug having a straight knurl on a shank is pressed into the bore to retain the plug to the shank, becoming embedded in the shank at either end of the enlarged portion. A head on the plug engages the outer end of the shank and interferes with the tab to hold the washer to the shank. The plug may have an annular groove for engagement by a removal tool.

13 Claims, 2 Drawing Sheets

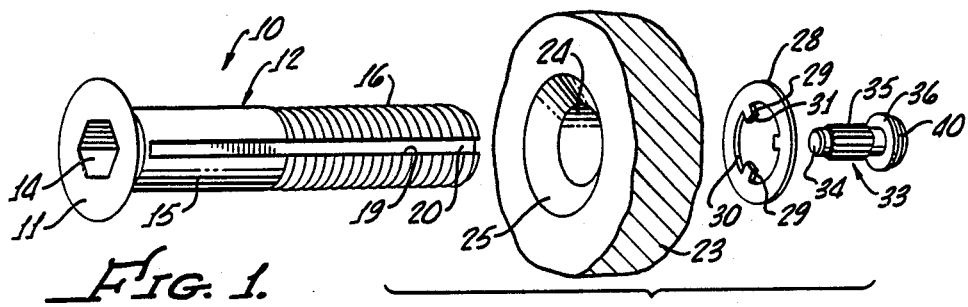
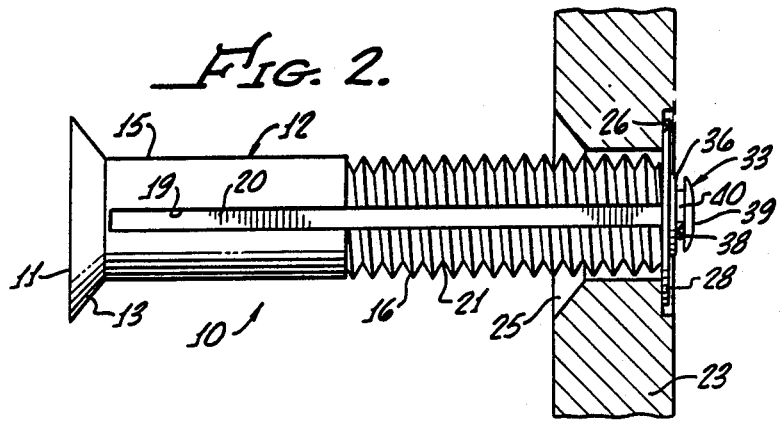
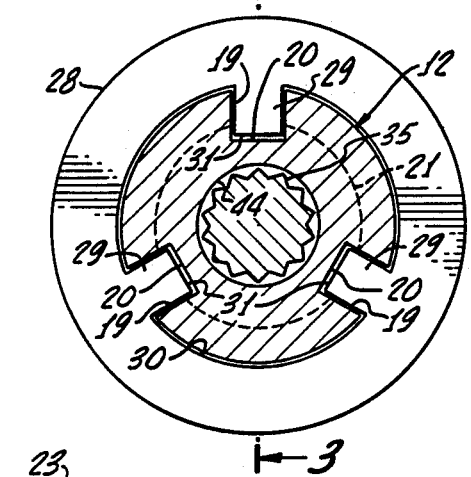
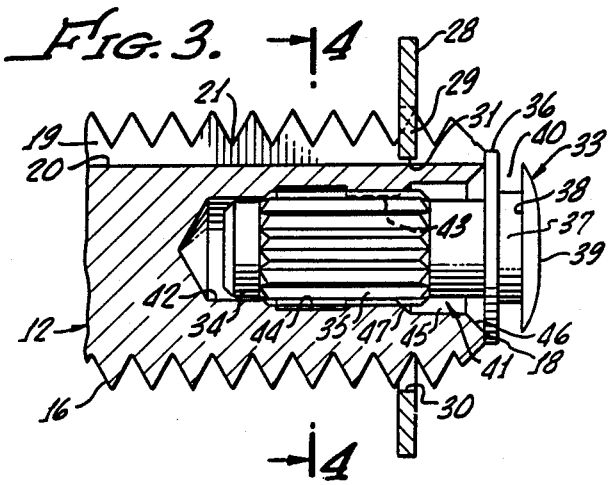
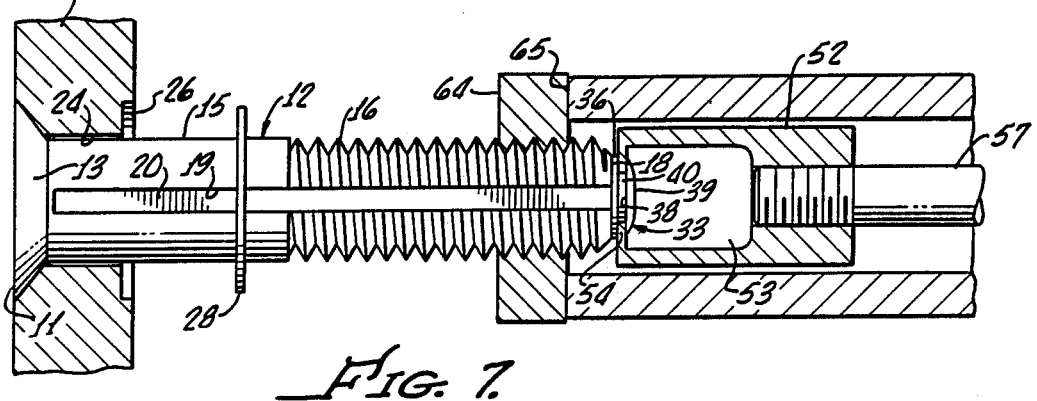

CAPTIVE FASTENER

BACKGROUND OF THE INVENTION

A captive panel fastener having considerable use in the aerospace industry, disclosed in U.S. Pat. No. 3,995,675, includes a screw with a head at one end and a shank projecting from the head. A thread is formed on the outer portion of the shank and three axial grooves extend most of the length of the shank from its outer end. A washer fits over the shank for retaining the fastener to a workpiece. Tabs on the inner edge of the washer extend into the grooves in the shank. At the outer end of the shank is a straight cylindrical bore into which is pressed the knurled shank of a plug. The plug has a head with a diameter such that it extends into the grooves in the shank, but the head is of lesser diameter than the root diameter of the thread. Therefore, the plug is held to the shank of the screw by the knurl and the head of the plug interferes with the tabs on the washer to prevent removal of the washer from the shank.

In use, the screw is extended through an opening in a panel and the washer and plug are applied afterward so that the plug holds the washer to the screw and the washer cooperates with the head of the screw to prevent removal of the screw from the panel.

Although it may be used effectively, this fastener has certain disadvantages. One is that it has been thought necessary to truncate the root of the thread so that the thread has a depth less than that of a standard thread. In theory this minimizes the depth necessary for the grooves so that the strength of the screw is not compromised. However, the truncated thread will not accept a conventional nut, requiring instead a special nut to mate with the screw. This adds to the expense of the fastener. Moreover, the truncated thread requires special dies, which are more expensive than and not as readily available as standard thread rolling dies. This increases the manufacturing cost of the fastener.

Another problem arises from the pressing of the plug into the bore formed in the end of the shank. Considerable force is necessary to accomplish this so that, in some instances, the head of the plug is not pressed fully into engagement with the outer end of the shank. Also, under certain tolerance conditions, the insertion of the knurled shank of the plug can cause expansion of the thread of the fastener at its outer end. This may make it impossible to mate the screw with a nut.

Once the plug is installed, it cannot be removed. In some instances, however, it is desirable to remove the plug so that the screw can be removed from a panel, reused or a different washer applied to it. With the prior art design, such steps are impossible and the entire fastener must be discarded if changes are to be made. Removal of the fastener from the panel becomes difficult because it can be accomplished only by breaking the retainer washer.

SUMMARY OF THE INVENTION

The present invention provides a captive panel fastener overcoming the above noted difficulties and having distinct advantages over the prior art. The fastener of this invention is provided with a full depth thread readily formed by conventional dies. This thread will mate with any standard nut. It has been found that use of a standard thread does not require deeper grooves or sacrifice of the strength of the fastener.

The bore for accepting the knurled plug at the end of the fastener is provided with an undercut between its ends, where the bore is of greater diameter. This enlarged diameter is greater than that of the outside of the knurl on the plug. Therefore, when the plug is inserted, it meets no resistance at the undercut portion and the insertion forces are less than with the conventional design. The knurl is embedded in the surface of the bore only at either end of the enlarged portion. This avoids the tendency to bulge the thread outwardly, assuring that the thread always will be of proper form and can mate with the nut which it is to engage. Greater retention of the plug is obtained than in prior designs because the material of the plug will become compressed as it is forced through the outer part of the bore in the shank of the screw, but will be allowed to expand in the enlarged portion of the bore. In effect, there is a slight bulging of the shank of the plug in the location of the enlarged portion of the bore. This provides an interference and better improves the retention of the plug in the bore. At the same time, the reduced insertion forces assure that the head on the plug will be brought into engagement with the end of the shank of the screw without difficulty.

The undercut bore of the shank of this invention will accept a conventional plug for retaining the washer on the shank. However, the plug may be made removable by providing an annular groove around the circumference of the head of the plug. The result is an overhang which can be engaged by a conventional removal tool. By threading a nut onto the shank of the screw, the removal tool can then engage the plug in the annular groove and pull the plug axially outwardly, while the opposite reaction is absorbed by the nut on the shank. Therefore, the plug may be removed without difficulty so that repairs and replacements are possible.

BRIEF DESCRIPTION OF THE DRAWINGS

FIG. 1 is an exploded perspective view of the fastener of this invention and a fragment of a panel to which it is to be attached;

FIG. 2 is a side elevational view, partially in section, of the fastener secured to a panel;

FIG. 3 is an enlarged fragmentary sectional view of the outer end portion of the fastener;

FIG. 4 is a transverse sectional view taken along line 4—4 of FIG. 3;

FIG. 7 is an enlarged sectional view of the engagement of the removal tool with the plug.

DETAILED DESCRIPTION OF THE INVENTION

Figure 5:
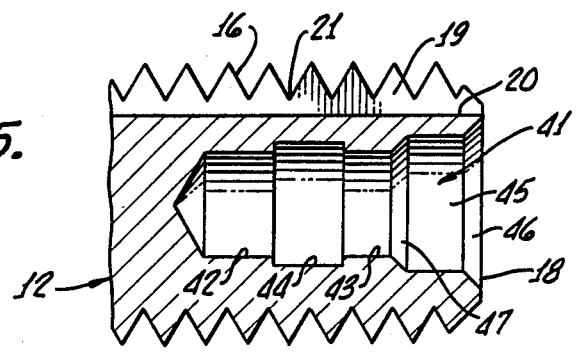
FIG. 5 is an enlarged fragmentary sectional view of the outer end of the shank of the screw without the plug inserted into it.

The fastener of this invention includes a screw 10 having a head 11 at one end from which extends a shank 12. In the example illustrated, the head 11 is a frustoconical undersurface 13 for a flush installation in a panel or other workpiece. A driving socket 14 extends axially inwardly from the outer end of the head 11.

Adjacent the head 11, the shank of the screw has a smooth cylindrical surface 15. The outer end portion 16 of the shank is externally threaded. This thread is of full depth so that the screw can mate with a standard nut. Extending axially inward from the outer end 18 of the shank 12 are three equally spaced grooves 19. These grooves extend the full length of the threaded portion 16 of the shank and into the cylindrical part 15, stopping short of the head 11. The grooves 19 are rectangular in end elevation with their inner surfaces 20 being below the root 21 of the thread, as seen in FIG. 4.

The screw 10 is associated with a panel 23, extending through an opening 24 which is generally complementary to the cylindrical portion 15 of the shank. At one end of the opening is a countersink 25 which receives the head 11 of the screw 10. A shallow counterbore 26 is at the opposite end of the opening 24.

After the shank of the screw 10 has been inserted into the opening 24, a washer 28 is extended over the threaded portion 16 of the shank. The washer is a flat continuous annular member with three equally spaced tabs 29 projecting radially inwardly from its inner edge 30. The inside diameter of the washer 28 is such that it will slide freely on the shank 11. The tabs 29 enter the grooves 19 and are dimensioned so that they will slide within the grooves without interference. The inner edges 31 of the tabs 29 are adjacent the bottom walls 20 of the grooves 19 when the washer 28 is o the shank 12 of the screw 10.

The washer 28 is retained on the shank 12 by means of a plug 33 secured to the end of the shank. The plug 33 includes a cylindrical pin or shank 34, having teeth in the form of a straight knurl 35 intermediate its ends. The outer diameter of the knurl 35 is greater than the diameter of the cylindrical part of the pin 34. Adjacent one end of the pin 34 is a head that includes a circular radially outwardly projecting flange 36. Beyond the flange 36 is a relatively short cylindrical segment 37 which is of a diameter slightly greater than that of the cylindrical part of the pin 34. The end of the head of the plug 33 is defined by an annular radial surface 38 projecting outwardly from the portion 37 to the edge of an outer domed surface 39. In this manner, an annular groove 40 is formed between the flange 36 and the radial surface 38.

The pin portion 34 of the plug 33 is received within an opening 41 in the outer end of the shank 12. At its inner end portion 42 this opening is of a diameter which is just greater than the cylindrical part 34 of the plug but smaller in diameter than the straight knurl 35. Spaced axially from the inner end portion 42 is a cylindrical bore section 43 which is of the same diameter as the portion 42. Between these two sections of the opening 41 is a relief at a cylindrical part 44 which is of greater diameter than that of the exterior of the knurl 35. The portion 45 of the bore adjacent the outer end of the shank 12 is of wider diameter than the portion 44. A countersink 46 leads into the bore 45 from the outer end of the shank 12 and a second countersink 47 interconnects the bore portions 45 and 43.

The plug 33 is pressed into the opening 41, as shown in FIG. 3, until the flange 36 is brought to bear against the outer end 18 of the shank 12 As this occurs, the straight knurl 35 is forced through the bore portion 43 with at least a partial broaching action. The outer end of the knurl 35 just enters the portion 42 of the opening where it becomes embedded. Thus, there is more engagement of the shank with the knurl at the bore portion 43 than at the bore portion 42. Inasmuch as there is a relief at the bore 44 between the bore portions 42 and 43, where the knurl does not engage the shank 12 of the screw 10, the axial force necessary to insert the plug 33 is relatively low. This means that there is no difficulty in assuring that the flange 36 abuts the end 18 of the shank. Also, the insertion of the plug will not cause the threads adjacent to it to become distorted outwardly, as sometimes occurs in conventional designs which have no such relief. Nevertheless, there is greater retention of the plug 33 in the end of the shank 12 than there is for the plug in the fastener of conventional design. This is because the material of the plug will be compressed as it goes through the restriction at the bore 43 and is free to expand when it reaches the relief at the bore 44. Therefore, the outer diameter of the knurl at the portion 44 of the bore is greater than that at the portion 43. This difference is slight but it is sufficient to securely hold the plug within the bore 41.

The function of the plug 33 is to retain the washer 28 on the shank 12 by closing off the ends of the grooves 19. The flange 36 is of a diameter less than the root diameter of the thread, but greater than the diameter of a circle which would be tangent to the inner edges of the tabs 29. Consequently, the flange 36 will interfere with the tabs 29 to prevent the washer 28 from sliding off the end of the shank 12.

When the fastener of this invention is in use, it may engage a standard nut because it is provided with a standard thread on its shank. When used to attach the panel 23 to an adjacent panel or other structure, the washer 28 will be received in the counterbore 26 in the panel 23. When the screw 10 is loosened and no longer engaged by a nut, it is retained to the panel 23 by the head 11 on one end, and the washer 28 on the other, both being of greater diameter than the opening 24 through the panel.

Figure 6:
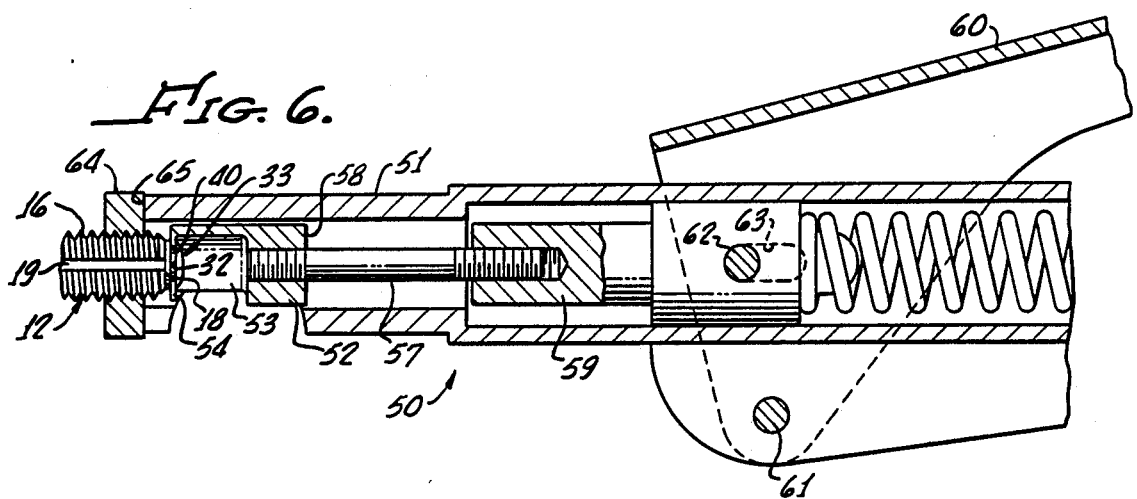
FIG. 6 is a sectional view showing a removal tool in engagement with the plug.
Figure 8:
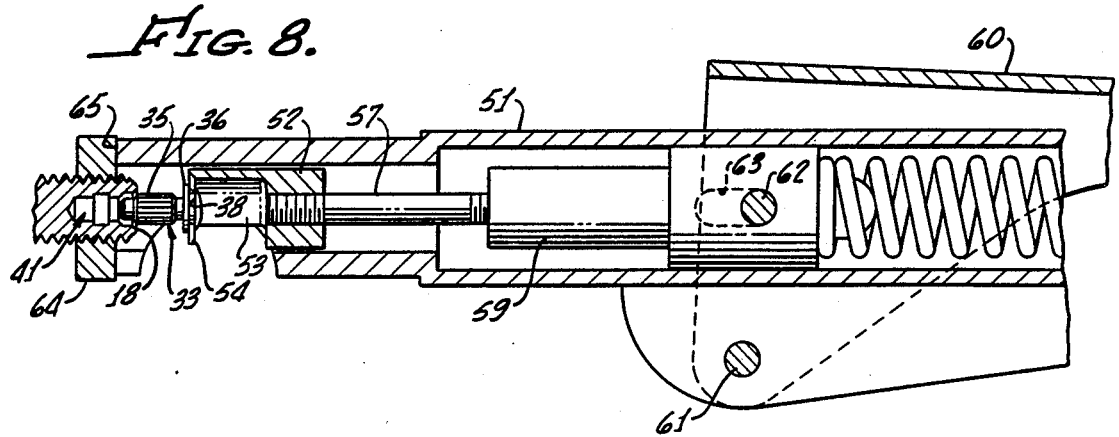
FIG. 8 is a view similar to FIG. 6, but with the removal tool actuated to remove the plug from the screw.

When necessary the plug 33 can be removed from the shank 12 without difficulty. This is accomplished by pulling on the exposed outer end flange surface 28 of the plug which is spaced outwardly from the end 18 of the shank 12 of the screw. The tool 50 for removing the plug, as shown in FIGS. 6 through 8, may be similar to the tool of U.S. patent Re 27, 978, with particular reference to FIGS. 12 through 15 of that patent. The tool 50 includes a tubular casing 51 which has an open outer end and is open along one side adjacent the outer end. Within the casing 51 is a slide 52 which is movable axially relative to the casing. The slide 52 has a hollow portion 53 adjacent a U-shaped end flange 54. This flange is dimensioned to fit within the groove 40 in the head of the plug 33. A rod 57 connects the opposite end 58 of the slide to a member 59 within the outer casing. A handle 60, pivotal about a pin 61, connects to the member 59 by a pin 62 at a slot 63 in the casing 51 of the tool. When the handle 60 is rotated, the member 59 is moved axially to the right, as illustrated, pulling the slide 52 in that direction.

In use of the tool 50, a nut 64 first is threaded onto the shank 12 to a location spaced from but relatively close to the outer end 18 of the shank. The outer end 65 of housing 51 is brought to bear against the nut 60 and the U-shaped flange 54 is inserted into the groove 40 of the plug 33. When the handle 60 of the tool then is rotated, the slide 52 is moved axially away from the end of the shank 12 while the nut 64 absorbs th opposite reaction that is created. This movement of the slide 52, reacting through the flange 54 and the surface 38 of the plug 33, pulls the plug from the opening 41 in the end of the shank 12. When this is done, the retaining washer 28 can be removed and replaced. Alternatively, the screw 10 may be separated from the panel 23 for use in some other location. Thus, repairs and reuse are possible with the arrangement of this invention.

If plug removal is not considered important in a particular instance, a plug having a conventional head with no groove for engagement by a removal tool may be employed as well. The advantage of the enlarged diameter portion 44 of the bore 41 intermediate its ends remains in that event.

The foregoing detailed description is to be clearly under stood as given by way of illustration and example only, the spirit and scope of this invention being limited solely by the appended claims.

What is claimed is:

1. In combination with a workpiece having an opening there through, a captive screw comprising:
   a member having a head means, and a shank extending from said head means and through said opening in said workpiece,
       said shank having a thread thereon, having an opening extending axially inward from the outer end of said shank,
           said opening in said shank including a first portion adjacent its outer end and a second portion inwardly of its outer end, said second portion having a greater lateral dimension than that of said first portion,
       and having at least one groove extending axially inward from the outer end thereof,
           said groove having a depth such that the inner surface thereof is radially inward of the root of said thread,
       a retainer on said shank for engagement with said workpiece for preventing separation of said member therefrom,
           said retainer including a tab projecting into said groove, and
       a plug for preventing said retainer from being separated from said shank,
           said plug including head means and a shank,
       said shank of said plug having tooth means thereon of greater lateral dimension than said first portion and lesser lateral dimension than said second portion of said opening in said shank of said member,
           said tooth means being embedded in said shank of said plug at said first portion of said opening therein,
       said head means of said plug engaging said outer end of said shank of said screw and having an outer periphery spaced inwardly of said root of said thread and spaced outwardly of said inner surface of said groove, whereby said head means of said plug interferes with said tab and prevents removal of said retainer from said shank of said screw.

2. A device as recited in claim 1, in which said thread is a full depth thread.

3. A device as recited in claim 1, in which said tooth means is a straight knurl extending around said shank of said plug.

4. A device as recited in claim 1, in which said opening in said shank of said member includes a third portion inwardly of and of lesser diameter than said second portion, said tooth means being embedded in said shank of said member at said third portion.

5. A device as recited in claim 4, in which said tooth means has a greater area of engagement with said shank of said member at said first portion than it does at said third portion of said opening in said shank.

6. A device as recited in claim 4, in which said first and third portions of said opening in said shank of said member are of the same diameter, and said second portion is an annular enlargement intermediate said first and third portions.

7. A device as recited in claim 6, in which said opening in said shank of said member includes an entrance portion outwardly of said first portion, said entrance portion being of greater diameter than said second portion.

8. A device as recited in claim 1, in which said head means of said plug includes a surface spaced outwardly from said end of said shank of said member for providing a means for engagement by a removal tool, whereby said plug may be removed from said opening in said shank of said member.

9. A device as recited in claim 8, in which for providing said surface of said head means of said plug there is an annular groove around the circumference of said head means of said plug.

10. The method of providing a captive fastener comprising the steps of:
   providing a screw having a head at one end and a shank projecting from said head,
   forming a thread on said shank,
   forming at least one axial groove in said shank extending inwardly from the outer end thereof such that the inner surface of said groove is radially inward of the root of said thread,
   providing a washer having a tab projecting from the inner edge thereof,
   extending said shank through an opening in a workpiece so that said head is adjacent one end of said opening and the outer end of said shank is adjacent the other end of said opening,
   extending said washer over said shank adjacent the opposite end of said opening with said tab received in said groove,
   forming a bore of predetermined diameter extending axially inward from the outer end of said shank,
   enlarging said bore intermediate its ends,
   forming a plug having a head and a shank,
   forming a straight knurl on said shank of said plug with the outside diameter of said straight knurl being greater than said predetermined diameter of said bore, but less than the diameter of said enlarged portion of said bore, and
   pressing said shank of said plug into said bore, such that said straight knurl becomes embedded in the surface of said bore at either end of said enlarged portion for thereby retaining said plug in said bore, said head of said plug being brought to bear against the outer end of said shank of said screw,
   said head of said plug being formed so as to have an outer diameter less than the root diameter of said thread and to have a periphery extending radially outward of said inner surface of said groove, whereby said head of said plug cooperates with said tab to hold said washer on said shank of said screw, and said washer and said head of said screw retain said screw to said workpiece.

11. The method as recited in claim 10, in which said thread is formed so as to have a full standard depth.

12. The method as recited in claim 10, including the step of forming an annular groove around the circumference of said head of said plug for providing a means for engagement with a removal tool for permitting removal of said plug from said bore.

13. The method as recited in claim 10, including the steps of:
forming a groove in the circumference of said head of said plug,
threading a nut onto said shank of said member,
engaging said plug at said groove with a first means,
engaging said nut with a second means,
pulling said first means outwardly of said shank of said member so as to create an opposite inward reaction, and
absorbing said opposite inward reaction with said second means and said nut,
whereby said first means pulls said plug from said bore in said shank of said member for permitting removal of said washer from said shank of said member.

* * * * *